(12) United States Patent
Zhao et al.

(10) Patent No.: US 11,528,062 B2
(45) Date of Patent: Dec. 13, 2022

(54) METHOD AND DEVICE FOR VIRTUAL PORT MAPPING FOR MASSIVE MIMO

(71) Applicant: Nokia Shanghai Bell Co., Ltd., Shanghai (CN)

(72) Inventors: Yan Zhao, Shanghai (CN); Huan Sun, Shanghai (CN); Hao Liu, Shanghai (CN)

(73) Assignee: Nokia Shanghai Bell Co., Ltd, Shanghai (CN)

( * ) Notice: Subject to any disclaimer, the term of this patent is extended or adjusted under 35 U.S.C. 154(b) by 0 days.

(21) Appl. No.: 17/047,501

(22) PCT Filed: Apr. 18, 2018

(86) PCT No.: PCT/CN2018/083604
§ 371 (c)(1),
(2) Date: Oct. 14, 2020

(87) PCT Pub. No.: WO2019/200570
PCT Pub. Date: Oct. 24, 2019

(65) Prior Publication Data
US 2021/0152221 A1 May 20, 2021

(51) Int. Cl.
*H04B 7/0452* (2017.01)
*H04W 72/04* (2009.01)

(52) U.S. Cl.
CPC ........ *H04B 7/0452* (2013.01); *H04W 72/044* (2013.01); *H04W 72/048* (2013.01)

(58) Field of Classification Search
CPC .. H04B 7/0452; H04B 7/0456; H04B 7/0617; H04B 7/0691; H04B 7/0697; H04B 7/0473; H04B 7/0634; H04W 72/044
See application file for complete search history.

(56) References Cited

U.S. PATENT DOCUMENTS

2014/0355707 A1* 12/2014 Kim ............... H04B 7/0456
375/267
2015/0312919 A1 10/2015 Lee et al.
(Continued)

FOREIGN PATENT DOCUMENTS

CN   102611489 A   7/2012
CN   103023545 A   4/2013
(Continued)

OTHER PUBLICATIONS

Qurrat-Ul-Ain Nadeem, Abla Kammoun and Mohamed-Slim Alouini, "Elevation Beamforming with Full Dimension MIMO Architectures in 5G Systems: A Tutorial, King Abdullah University of Science and Technology", May 2018 (Year: 2018).*
(Continued)

*Primary Examiner* — Aristocratis Fotakis
(74) *Attorney, Agent, or Firm* — Harness, Dickey & Pierce, P.L.C.

(57) ABSTRACT

The present disclosure aims to provide a method and device for virtual port mapping of massive MIMO. The present disclosure maps one or more transceiver units to a virtual port by performing hybrid beamforming for at least one transceiver unit in massive MIMO, and then performs digital precoding based on the virtual port. Compared with the prior art, the present disclosure is an adaptive technology adapted to the existing architecture; the present disclosure is based on virtual port mapping technology, which reduces the number of ports required for baseband processing, thus simplifying baseband processing, and furthermore, the present disclosure does not reduce the number of antenna elements utilized; the present disclosure can utilize digital precoding in hybrid beamforming to perform energy efficiency management; the present disclosure can be used more flexibly as a medium-term beamforming scheme in different frequency domain and time domain, while traditional analog (Continued)

beamforming is a long-term/semi-static beamforming scheme in time domain.

11 Claims, 7 Drawing Sheets

(56) References Cited

U.S. PATENT DOCUMENTS

| | | | | |
|---|---|---|---|---|
| 2016/0149619 A1* | 5/2016 | Won | .................... | H04B 7/0417 |
| | | | | 375/267 |
| 2016/0337017 A1* | 11/2016 | Moon | .................. | H04B 7/0617 |
| 2017/0141832 A1* | 5/2017 | Ji | .......................... | H04B 7/0626 |
| 2017/0230091 A1* | 8/2017 | Song | ................... | H04B 7/0617 |
| 2018/0006697 A1* | 1/2018 | Song | ................... | H04B 7/0617 |
| 2018/0175915 A1* | 6/2018 | Zhang | ................ | H04W 72/082 |
| 2019/0181928 A1* | 6/2019 | Pan | .......................... | H04B 7/02 |
| 2019/0223175 A1* | 7/2019 | Hakola | ................ | H04W 72/14 |
| 2019/0341981 A1* | 11/2019 | Park | .................... | H04B 7/0417 |
| 2019/0349151 A1* | 11/2019 | Zhang | ............... | H04W 72/0446 |
| 2020/0358509 A1* | 11/2020 | Wernersson | .......... | H04L 5/0051 |
| 2021/0028831 A1* | 1/2021 | Lou | ..................... | H04B 7/0417 |

FOREIGN PATENT DOCUMENTS

| | | |
|---|---|---|
| CN | 103391128 A | 11/2013 |
| CN | 105991172 A | 10/2016 |
| CN | 106716856 A | 5/2017 |
| EP | 2777172 A1 | 9/2014 |
| EP | 3068060 A1 | 9/2016 |
| WO | WO-2017/195183 A1 | 11/2017 |

OTHER PUBLICATIONS

Sungwoo Park, Ahmed Alkhateeb and Robert W. Heath Jr, "Dynamic Subarrays for Hybrid Precoding in Wideband mmWave MIMO Systems", IEEE Transactions on Wireless Communications, vol. 16, No. 5, May 2017 (Year: 2017).*
International Search Report PCT/ISA/210 for International Application No. PCT/CN2018/083604 dated Jan. 3, 2019.
CN Office Action for corresponding Chinese Patent Application No. 201880091804.3 dated May 6, 2022.
Extended European Search Report dated Feb. 17, 2022 for corresponding European Application No. 18915011.3.
CN Office Action for corresponding Chinese Patent Application No. 201880091804.3 dated Sep. 27, 2022.

* cited by examiner

METHOD AND DEVICE FOR VIRTUAL PORT MAPPING FOR MASSIVE MIMO

CROSS-REFERENCE TO RELATED APPLICATIONS

This application is a national phase under 35 U.S.C. § 371 of PCT International Application No. PCT/CN2018/083604 which has an International filing date of Apr. 18, 2018, the entire contents of which is hereby incorporated by reference.

TECHNICAL FIELD

The present disclosure relates to the field of communications, in particular to a virtual port mapping technology of massive MIMO.

BACKGROUND

The miniaturization of single antenna and the high frequency in 5G wireless systems increase the path loss, making massive MIMO (massive Multiple-Input Multiple-Output) become a solution in 5G, that is, massive MIMO with a large number of antennas is used in an antenna array of the same size to compensate for the high path loss. In this scheme, a large number of antennas (e.g., hundreds or thousands) are deployed to provide better spectrum efficiency and better energy efficiency.

However, for practical products, it is infeasible to employ full digital precoding to achieve massive MIMO gain on the whole radio frequency chains (e.g., 64RF chain or more). The main bottlenecks are hardware processing complexity and cost, channel measurement and feedback overhead.

Considering the practical constraints in product implementation, the prior art mainly reduces the size of the array by reducing the antenna elements, such as selecting partial transceiver units (TRX). Due to the reduction of antenna elements, the elements used to transmit data are reduced, this approach results in the potential risk of significant loss of performance in both cell coverage and cell throughput.

SUMMARY

The object of the present disclosure is to provide a method and apparatus for virtual port mapping of massive MIMO.

According to an embodiment of the present disclosure, a method for virtual port mapping of massive MIMO is provided, wherein the method comprises:

mapping at least one transceiver unit in massive MIMO to a virtual port through hybrid beamforming;

performing digital precoding based on the virtual port.

Optionally, the step of hybrid beamforming comprises:

performing analog beamforming in at least one transceiver unit in massive MIMO;

performing digital precoding between the transceiver units after the analog beamforming.

Optionally, the method further comprises:

determining hybrid beamforming weight corresponding to at least one transceiver unit in massive MIMO;

wherein the step of mapping to a virtual port comprises:

mapping the at least one transceiver unit to a virtual port through hybrid beamforming according to the hybrid beamforming weight.

Optionally, the hybrid beamforming weight comprises analog beamforming weight in transceiver unit and/or digital precoding weight between transceiver units.

Optionally, the method further comprises:

determining one or more virtual port modes for the massive MIMO according to user distribution of the cell served by the massive MIMO, wherein the virtual port modes comprise the number of virtual ports corresponding to the massive MIMO, the number of transceiver units in each virtual port, and position information of the transceiver units among antenna arrays;

Wherein the step of mapping to a virtual port comprises:

mapping, based on the virtual port mode, at least one transceiver unit in the massive MIMO to a virtual port corresponding to the transceiver unit in the virtual port mode through hybrid beamforming.

Optionally, the step of determining one or more virtual port modes for the massive MIMO comprises:

determining one or more candidate virtual port modes for the massive MIMO according to the potential user distribution of the cell served by the massive MIMO, wherein the candidate virtual port modes comprise the number of virtual ports corresponding to the massive MIMO, the number of transceiver units in each virtual port and position information of the transceiver units among antenna arrays;

determining at least one candidate virtual port mode as the virtual port modes corresponding to the massive MIMO according to the current time domain and/or frequency domain demand information of the cell served by the massive MIMO.

According to another embodiment of the present disclosure, there is also provided a mapping device for virtual port mapping of massive MIMO, wherein the mapping device includes:

means for mapping at least one transceiver unit in massive MIMO to a virtual port through hybrid beamforming;

means for performing digital precoding based on the virtual port.

Optionally, the means for mapping at least one transceiver unit in massive MIMO to a virtual port through hybrid beamforming is configured for:

performing analog beamforming in at least one transceiver unit in massive MIMO;

performing digital precoding between the transceiver units after the analog beamforming.

Optionally, the mapping device further comprises:

means for determining hybrid beamforming weight corresponding to at least one transceiver unit in massive MIMO;

wherein the means for mapping at least one transceiver unit in massive MIMO to a virtual port through hybrid beamforming is configured for:

mapping the at least one transceiver unit to a virtual port through hybrid beamforming according to the hybrid beamforming weight.

Optionally, the hybrid beamforming weight comprises analog beamforming weight in transceiver unit and/or digital precoding weight between transceiver units.

Optionally, the mapping device further comprises:

means for determining one or more virtual port modes for the massive MIMO according to user distribution of the cell served by the massive MIMO, wherein the virtual port modes comprise the number of virtual ports corresponding to the massive MIMO, the number of transceiver units in each virtual port, and position information of the transceiver units among antenna arrays;

Wherein the means for mapping at least one transceiver unit in massive MIMO to a virtual port through hybrid beamforming is configured for:

mapping, based on the virtual port mode, at least one transceiver unit in the massive MIMO to a virtual port corresponding to the transceiver unit in the virtual port mode through hybrid beamforming.

Optionally, the means for determining one or more virtual port modes for the massive MIMO is configured for:

determining one or more candidate virtual port modes for the massive MIMO according to the potential user distribution of the cell served by the massive MIMO, wherein the candidate virtual port modes comprise the number of virtual ports corresponding to the massive MIMO, the number of transceiver units in each virtual port and position information of the transceiver units among antenna arrays;

determining at least one candidate virtual port mode as the virtual port modes corresponding to the massive MIMO according to the current time domain and/or frequency domain demand information of the cell served by the massive MIMO.

According to another embodiment of the present disclosure, there is also provided a base station for virtual port mapping of massive MIMO, wherein the base station comprises the mapping device according to any one of the above.

According to another embodiment of the present disclosure, there is also provided a computer readable storage medium having computer readable instructions stored therein which, when executed by one or more devices, cause the devices to perform the method according to any one of the above.

According to another embodiment of the present disclosure, there is also provided a computer program product, when the computer program product is executed by a computer device, the method according to any one of the above is performed.

According to another embodiment of the present disclosure, there is also provided a computer device, the computer device comprising:

one or more processors;

a memory for storing one or more computer programs;

the one or more computer programs, when executed by the one or more processors, cause the one or more processors to implement the method according to any one of the above.

Compared with the prior art, the present disclosure maps one or more transceiver units to a virtual port by performing hybrid beamforming for at least one transceiver unit in massive MIMO, and then performs digital precoding based on the virtual port; thus, the present disclosure can have the following advantages:

1) The present disclosure is an adaptive technology adapted to the existing architecture, especially suitable for baseband processing of massive MIMO in 5G NR.

2) The present disclosure is based on virtual port mapping technology, which reduces the number of ports required for baseband processing, thus simplifying baseband processing, and furthermore, the present disclosure does not reduce the number of antenna elements utilized. Compared with the mode of reducing physical ports in the prior art, the performance of the present disclosure in single user scheduling and multi-user scheduling is greatly improved.

3) The present disclosure can utilize digital precoding in hybrid beamforming to perform energy efficiency management.

4) The present disclosure can be used more flexibly as a medium-term beamforming scheme in different frequency domain and time domain, while traditional analog beamforming is a long-term/semi-static beamforming scheme in time domain.

BRIEF DESCRIPTION OF THE ACCOMPANYING DRAWINGS

Other features, objectives, and advantages of the present disclosure will become more apparent through reading the following detailed depiction of the non-limitative embodiments with reference to the accompanying drawings.

Same or similar reference numbers in the drawings represent the same or similar components.

DETAILED DESCRIPTION

Figure 1:
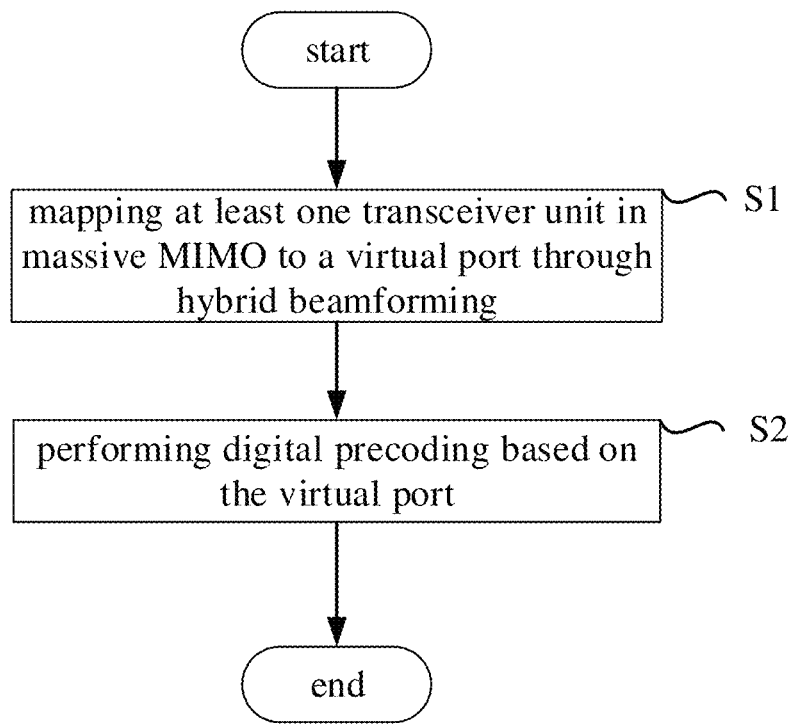
FIG. 1 shows a flow diagram of a method for virtual port mapping of massive MIMO according to an embodiment of the present disclosure.

The present disclosure will be further described in detail below with reference to the accompanying drawings.

In a typical configuration of the present disclosure, both the device and the trusted party include one or more processors (CPUs), input/output interfaces, network interfaces and memory.

The memory may include non-permanent memory, Random Access Memory (RAM) and/or non-volatile memory in computer readable media, such as Read Only Memory (ROM) or flash memory (flash RAM). Memory is an example of a computer readable medium.

Computer readable media include permanent and non-permanent, removable and non-removable media, may implement the information storage by any method or technology. The information may be computer readable instructions, data structures, modules of a program, or other data. Examples of computer storage media include, but are not limited to, Phase Change Memory (PRAM), Static Random Access Memory (SRAM), Dynamic Random Access Memory (DRAM), other types of Random Access Memory (RAM), Read Only Memory (ROM), Electrically Erasable Programmable Read-Only Memory (EEPROM), flash memory or other memory technology, Compact Disc Read-Only Memory (CD-ROM), Digital Versatile Disks (DVD) or other optical storage, magnetic cassettes, magnetic tape, magnetic disk storage or other magnetic storage devices, or any other non-transmission medium, which can be used to store information that can be accessed by a computing device.

The mapping device referred to in the present disclosure includes, but is not limited to, a network device or a base station device. The network device includes an electronic device capable of automatically performing numerical calculation and information processing according to preset or stored instructions, and hardware thereof includes, but is not limited to, a microprocessor, an Application Specific Integrated Circuit (ASIC), a Programmable Logic Device (PLD), a Field Programmable Gate Array (FPGA), a Digital Signal Processor (DSP), an embedded device, and the like. The network device includes, but is not limited to, a computer, a network host, a single network server, multiple network server sets, or a cloud composed of multiple servers; here, the cloud is composed of a large number of computers or network servers based on Cloud Computing, wherein cloud computing is a type of distributed computing, a virtual supercomputer composed of a cluster of loosely coupled computer sets. The network includes, but not limited to, the internet, a wide area network, a metropolitan area network, a local area network, a VPN network, a wireless Ad Hoc network, etc.

The base station device may be considered synonymous with and/or refer to the following: a Base Transceiver Station (BTS), base station (NodeB), extended base station (eNB), femtocell, access point, etc., and may be described as a device that provides radio baseband functionality for data and/or voice connectivity between the network and one or more users.

In addition, the user equipment in the present disclosure includes, but is not limited to, any mobile electronic product, such as a smart phone, a tablet computer, etc., which can perform human-computer interaction with a user (for example, human-computer interaction through a touch panel), and the mobile electronic product may employ any operating system, such as an android operating system, an iOS operating system, etc.

Communication from the base station to the user equipment is commonly referred to as downlink or forward link communication. Communication from the user equipment to the base station is commonly referred to as uplink or reverse link communication.

Preferably, the present disclosure can be applied to a 5G system.

Of course, those skilled in the art will understand that the above-described devices are merely exemplary, and that other existing or future existing devices, as may be suitable for use in the present disclosure, are intended to be encompassed within the scope of the present disclosure and are hereby incorporated by reference.

In the description of the present disclosure, "plurality" means two or more, unless otherwise clearly defined.

FIG. 1 shows a flow diagram of a method for virtual port mapping of massive MIMO according to an embodiment of the present disclosure. In step S1, the mapping device maps at least one transceiver unit in massive MIMO to a virtual port through hybrid beamforming; in step S2, the mapping device performs digital precoding based on the virtual port.

Specifically, in step S1, the hybrid beamforming includes analog beamforming and digital precoding.

Here, if the number of the transceiver units mapped to the same virtual port is greater than 1, the hybrid beamforming step includes: performing analog beamforming in a plurality of transceiver units in massive MIMO; performing digital precoding between the plurality of transceiver units after the analog beamforming to combine them into a virtual port. Thus, after analog beamforming and digital precoding, the plurality of transceiver units are mapped to a virtual port.

If the number of the transceiver units mapped to the same virtual port is equal to 1, the mapping device may use hybrid beamforming step to perform analog beamforming and digital precoding on the transceiver unit, so as to map the transceiver unit to a virtual port. Alternatively, the mapping device may only perform analog beamforming on the transceiver unit.

Then, in step S2, the mapping device performs digital precoding based on the virtual port. Here, for a virtual port formed by one transceiver unit, its digital precoding is regarded as a unit matrix.

Through the above steps, the present disclosure designs an intermediate layer between analog beamforming and traditional baseband digital precoding, and each virtual port includes at least one transceiver unit to be mapped to antenna port as a minimum unit. Then, the traditional digital precoding is transferred from the transceiver units onto the virtual port.

Those skilled in the art should understand that, for the same massive MIMO, the plurality of transceiver units included therein may be mapped to different virtual ports in one or more ways.

Figure 2:
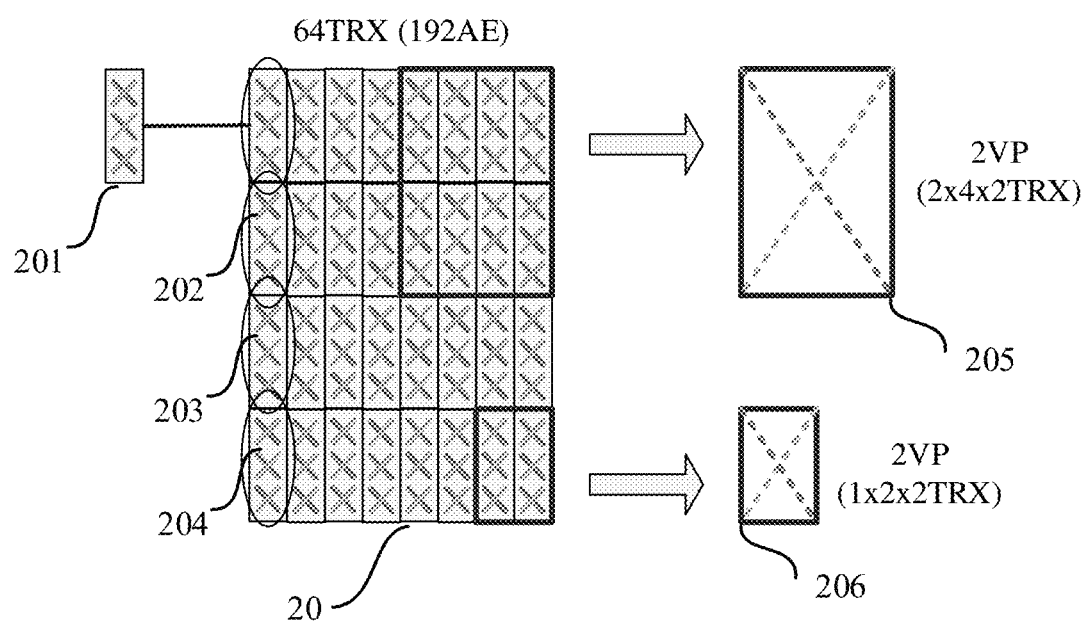
FIG. 2 shows a schematic diagram of a virtual port mapping according to a preferred embodiment of the present disclosure.

FIG. 2 shows a schematic diagram of a virtual port mapping according to a preferred embodiment of the present disclosure. Massive MIMO 20 contains 192 antenna elements (AE) in total; the transceiver unit 201 includes 6 antenna elements, and since these 6 antenna elements belong to two poles, the transceiver unit 201 represents 2 transceiver units (TRX), that is, each transceiver unit contains 3 antenna elements on the same pole. It can be seen that the massive MIMO 20 includes 64 transceiver units (TRX) in total.

The virtual port 205 includes 16 transceiver units, through virtual port mapping technique, the 16 transceiver units are mapped to 2 virtual ports (corresponding to two poles respectively), and each virtual port includes 8 transceiver units.

The virtual port 206 includes 4 transceiver units, through virtual port mapping technique, the 4 transceiver units are mapped to 2 virtual ports (corresponding to two poles respectively), and each virtual port includes 2 transceiver units.

Here, the position of the transceiver unit(s) between antenna arrays can affect the performance of the virtual port.

For example, as shown in FIG. 2, if the transceiver 201 and the transceiver 202 are mapped to a first virtual port, the transceiver 203 and the transceiver 204 are mapped to a second virtual port, the transceiver 201 and the transceiver 203 are mapped to a third virtual port, and the transceiver 202 and the transceiver 204 are mapped to a fourth virtual port, the performance corresponding to the above four virtual ports are all different.

Preferably, the present disclosure further includes step S3 (not shown), wherein in step S3, the mapping device determines hybrid beamforming weight corresponding to at least one transceiver unit in massive MIMO; then, in step S1, the mapping device maps the at least one transceiver unit to a virtual port through hybrid beamforming according to the hybrid beamforming weight.

Here, the hybrid beamforming weight includes analog beamforming weight in transceiver unit and/or digital precoding weight between transceiver units.

The analog beamforming weight in transceiver unit includes two setting modes: one is that the weight corresponding to each transceiver unit is different; the other is that the weight corresponding to each transceiver unit is the same. The former has higher diversity gain and the latter has higher beam gain. An appropriate weight setting manner may be selected based on actual demand and processing performance.

The digital precoding weight between transceiver units includes two setting modes: one is to set the digital precoding weight based on user measurement feedback and/or uplink channel measurement, for example, first configure a part of transceiver units to map to a virtual port in a 1:1 manner to send pilot signals for user measurement feedback and/or base station uplink channel measurement, when the user measurement feedback and/or the base station uplink channel measurement information are obtained, the digital precoding weight is set based on the above information, and digital precoding is performed on the transceiver unit; and the other is to set a fixed digital precoding weight. In step S3, the mapping device can determine the hybrid beamforming weight based on a default scheme, or can determine the hybrid beamforming weight in real time based on the current actual demand and processing performance. Then, in step S1, the mapping device performs mapping on the at least one transceiver unit according to the hybrid beamforming weight.

Figure 3:
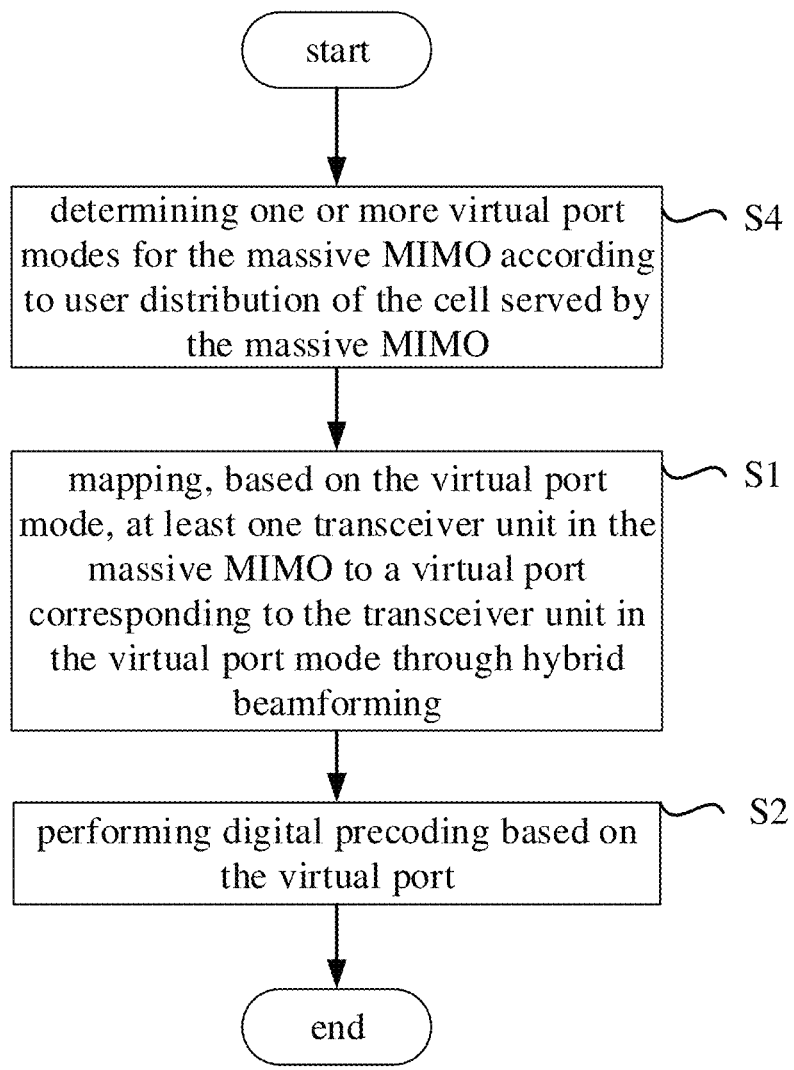
FIG. 3 shows a flow diagram of a method for virtual port mapping of massive MIMO according to another embodiment of the present disclosure.

FIG. 3 shows a flow diagram of a method for virtual port mapping of massive MIMO according to another embodiment of the present disclosure. In step S4, the mapping device determines one or more virtual port modes for massive MIMO according to user distribution of the cell served by the massive MIMO, where the virtual port modes comprise the number of virtual ports corresponding to the massive MIMO, the number of transceiver units in each virtual port, and position information of the transceiver units among antenna arrays; in step S1, the mapping device maps, based on the virtual port mode, at least one transceiver unit in the massive MIMO to a virtual port corresponding to the transceiver unit in the virtual port mode through hybrid beamforming; in step S2, the mapping device performs digital precoding based on the virtual port.

Wherein, the step S2 is the same as or similar to the step S2 shown in FIG. 1, so it is not repeated here and is included here by reference.

Specifically, in step S4, the mapping device determines one or more virtual port modes for the massive MIMO in a real-time determined or predetermined manner.

Wherein, when in a real-time determined manner:

In step S4, the mapping device obtains the user distribution of the cell served by the massive MIMO directly, or analyzes the current scenario to obtain the user distribution; wherein the user distribution includes the position of user in the cell, the distance between user and the massive MIMO, the angle between user and the massive MIMO, the signal strength of user, and the like.

Then, the mapping device determines one or more virtual port modes for the massive MIMO according to the determined user distribution, where the virtual port mode is a mapping mode for mapping at least one transceiver unit in the massive MIMO to different virtual ports in a grouped manner, and the virtual port mode includes the number of virtual ports corresponding to the massive MIMO, the number of transceiver units in each virtual port, and position information of the transceiver units among antenna arrays.

When in a predetermined manner:

In step S4, the mapping device determines one or more candidate virtual port modes for the massive MIMO in advance according to the potential user distribution of the cell served by the massive MIMO, wherein the potential user distribution may be determined based on historical data of the serving cell or other serving cells, or may be determined based on system default settings.

Then, the mapping device determines at least one candidate virtual port mode as the virtual port modes corresponding to the massive MIMO by a preset or real-time selection mode according to the current time domain and/or frequency domain demand information of the cell served by the massive MIMO.

For example, for cell edge users, a greater number of virtual ports or a greater virtual port size is required. Furthermore, in principle, the more antenna ports separated between an antenna array, the better the performance.

Preferably, for users at different distances, the downlink virtual port number/virtual port size and downlink transmit power allocation can be automatically adjusted based on the following two factors:

One is based on Uplink Power Control Transmit Power (ULPC TxPw) and Power Headroom, for example, the Power Headroom and Reference Signal Received Power (RSRP) of cell edge users are lower;

The second is based on Downlink Channel State Information (DL CSI) feedback, for example, the Channel Quality Indication (CQI) of cell edge users is lower.

Therefore, the present disclosure can judge the distance of the user based on the above two factors, and further determine the required downlink virtual port number/virtual port size and the downlink transmission power. For example, a greater number of virtual ports or a greater virtual port size may be allocated for cell edge users.

Since the scenario of the serving cell is constantly changing, the mapping device may determine a plurality of virtual port modes for use. In step S1, based on the virtual port modes, at least one transceiver unit in the massive MIMO is mapped to a virtual port corresponding to the transceiver unit in the virtual port modes through hybrid beamforming.

Figure 4:
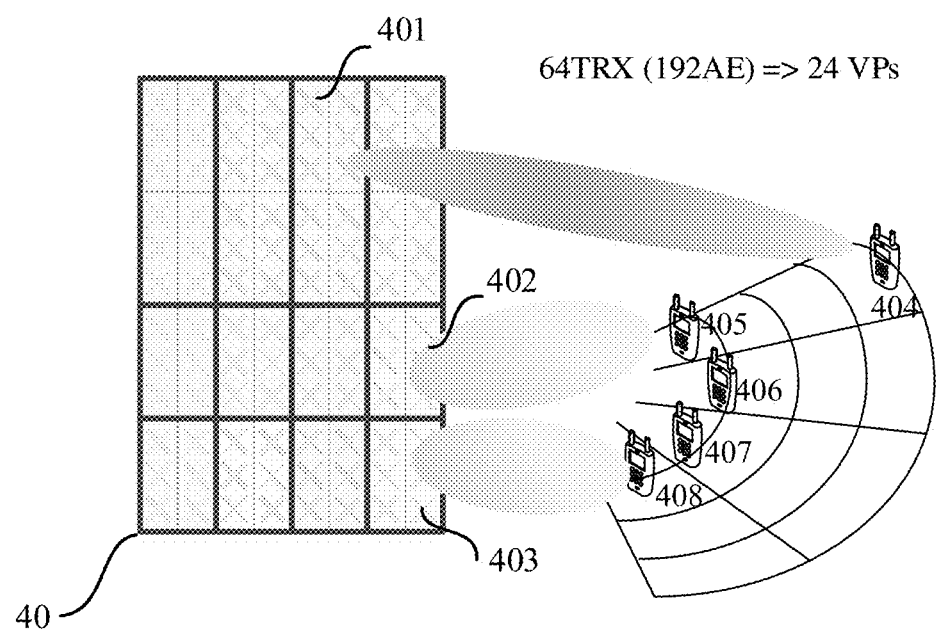
FIG. 4 shows a schematic diagram of a virtual port mapping mode according to a preferred embodiment of the present disclosure.

FIG. 4 shows a schematic diagram of a virtual port mapping mode according to a preferred embodiment of the present disclosure.

The massive MIMO 40 includes a total of 192 Antenna Elements (AE), and the 192 Antenna elements constitute 64 transceiver units. Through mapping, the 64 transceiver units are mapped to 24 virtual ports, wherein the virtual port 401 includes 8 transceiver units, the virtual port 402 and the virtual port 403 include 4 transceiver units.

The virtual port 401 is used for user equipment 404 at the cell edge; while the virtual port 402 and the virtual port 403 are used for user equipment 405, user equipment 406, user equipment 407 and user equipment 408 inside the cell.

Figure 5:
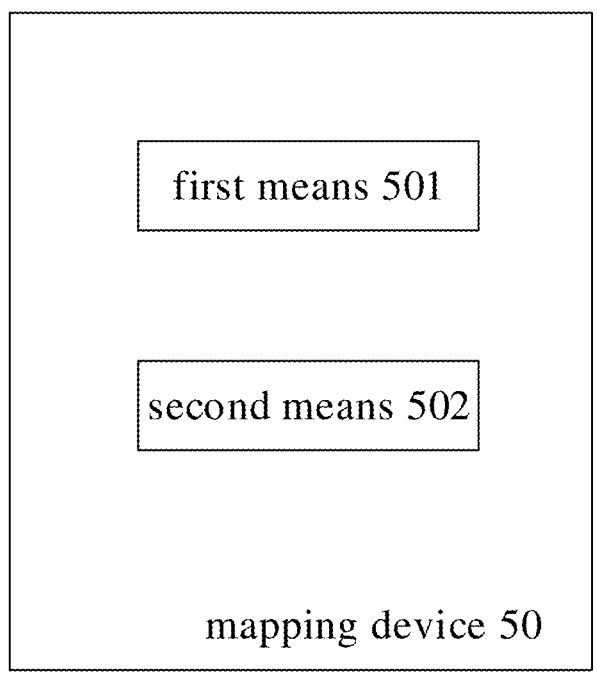
FIG. 5 shows a schematic diagram of a mapping device for virtual port mapping of massive MIMO according to an embodiment of the present disclosure.

FIG. 5 shows a schematic diagram of a mapping device for virtual port mapping of massive MIMO according to an embodiment of the present disclosure; wherein, the mapping device 50 includes a first means 501 and a second means 502.

Specifically, the first means 501 maps at least one transceiver unit in massive MIMO to a virtual port through hybrid beamforming; the second means 502 performs digital precoding based on the virtual port.

The hybrid beamforming includes analog beamforming and digital precoding.

Here, if the number of the transceiver units mapped to the same virtual port is greater than 1, the hybrid beamforming step includes: performing analog beamforming in a plurality of transceiver units in massive MIMO; performing digital precoding between the plurality of transceiver units after the analog beamforming to combine them into a virtual port. Thus, after analog beamforming and digital precoding, the plurality of transceiver units are mapped to a virtual port.

If the number of the transceiver units mapped to the same virtual port is equal to 1, the mapping device may use hybrid beamforming step to perform analog beamforming and digital precoding on the transceiver unit, so as to map the transceiver unit to a virtual port. Alternatively, the mapping device may only perform analog beamforming on the transceiver unit.

Then, the second means 502 performs digital precoding based on the virtual port. Here, for a virtual port formed by one transceiver unit, its digital precoding is regarded as a unit matrix.

Through the above steps, the present disclosure designs an intermediate layer between analog beamforming and traditional baseband digital precoding, and each virtual port includes at least one transceiver unit to be mapped to antenna port as a minimum unit. Then, the traditional digital precoding is transferred from the transceiver units onto the virtual port.

Those skilled in the art should understand that, for the same massive MIMO, the plurality of transceiver units included therein may be mapped to different virtual ports in one or more ways.

Preferably, the mapping device 50 further includes a third means (not shown), wherein, the third means determines hybrid beamforming weight corresponding to at least one transceiver unit in massive MIMO; then, the first means 501 maps the at least one transceiver unit to a virtual port through hybrid beamforming according to the hybrid beamforming weight.

Here, the hybrid beamforming weight includes analog beamforming weight in transceiver unit and/or digital precoding weight between transceiver units.

The analog beamforming weight in transceiver unit includes two setting modes: one is that the weight corresponding to each transceiver unit is different; the other is that the weight corresponding to each transceiver unit is the same. The former has higher diversity gain and the latter has higher beam gain. An appropriate weight setting manner may be selected based on actual demand and processing performance.

The digital precoding weight between transceiver units includes two setting modes: one is to set the digital precoding weight based on user measurement feedback and/or uplink channel measurement, for example, first configure a part of transceiver units to map to a virtual port in a 1:1 manner to send pilot signals for user measurement feedback and/or base station uplink channel measurement, when the user measurement feedback and/or the base station uplink channel measurement information are obtained, the digital precoding weight is set based on the above information, and digital precoding is performed on the transceiver unit; and the other is to set a fixed digital precoding weight.

The third means can determine the hybrid beamforming weight based on a default scheme, or can determine the hybrid beamforming weight in real time based on the current actual demand and processing performance. Then, the first means 501 performs mapping on the at least one transceiver unit according to the hybrid beamforming weight.

Figure 6:
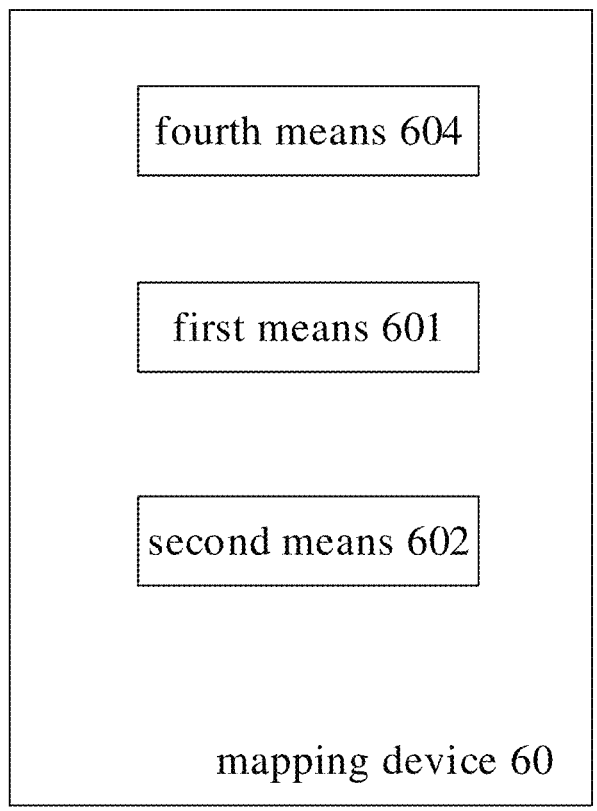
FIG. 6 shows a schematic diagram of a mapping device for virtual port mapping of massive MIMO according to another embodiment of the present disclosure.

FIG. 6 shows a schematic diagram of a mapping device for virtual port mapping of massive MIMO according to another embodiment of the present disclosure. Wherein, the mapping device 50 includes a fourth means 604, a first means 601 and a second means 602.

Specifically, the fourth means 604 determines one or more virtual port modes for massive MIMO according to user distribution of the cell served by the massive MIMO, where the virtual port modes comprise the number of virtual ports corresponding to the massive MIMO, the number of transceiver units in each virtual port, and position information of the transceiver units among antenna arrays; the first means 601 maps, based on the virtual port mode, at least one transceiver unit in the massive MIMO to a virtual port corresponding to the transceiver unit in the virtual port mode through hybrid beamforming; the second means 602 performs digital precoding based on the virtual port.

Wherein, the second means 602 is the same as or similar to the second means 502 shown in FIG. 5, so it is not repeated here and is included here by reference.

Specifically, the fourth means 604 determines one or more virtual port modes for the massive MIMO in a real-time determined or predetermined manner.

Wherein, when in a real-time determined manner:

The fourth means 604 obtains the user distribution of the cell served by the massive MIMO directly, or analyzes the current scenario to obtain the user distribution; wherein the user distribution includes the position of user in the cell, the distance between user and the massive MIMO, the angle between user and the massive MIMO, the signal strength of user, and the like.

Then, the mapping device determines one or more virtual port modes for the massive MIMO according to the determined user distribution, where the virtual port mode is a mapping mode for mapping at least one transceiver unit in the massive MIMO to different virtual ports in a grouped manner, and the virtual port mode includes the number of virtual ports corresponding to the massive MIMO, the number of transceiver units in each virtual port, and position information of the transceiver units among antenna arrays.

When in a predetermined manner:

The fourth means 604 determines one or more candidate virtual port modes for the massive MIMO in advance according to the potential user distribution of the cell served by the massive MIMO, wherein the potential user distribution may be determined based on historical data of the serving cell or other serving cells, or may be determined based on system default settings.

Then, the fourth means 604 determines at least one candidate virtual port mode as the virtual port modes corresponding to the massive MIMO by a preset or real-time selection mode according to the current time domain and/or frequency domain demand information of the cell served by the massive MIMO.

For example, for cell edge users, a greater number of virtual ports or a greater virtual port size is required. Furthermore, in principle, the more antenna ports separated between an antenna array, the better the performance.

Preferably, for users at different distances, the downlink virtual port number/virtual port size and downlink transmit power allocation can be automatically adjusted based on the following two factors:

One is based on Uplink Power Control Transmit Power (ULPC TxPw) and Power Headroom, for example, the Power Headroom and Reference Signal Received Power (RSRP) of cell edge users are lower;

The second is based on Downlink Channel State Information (DL CSI) feedback, for example, the Channel Quality Indication (CQI) of cell edge users is lower.

Therefore, the present disclosure can judge the distance of the user based on the above two factors, and further determine the required downlink virtual port number/virtual port size and the downlink transmission power. For example, a greater number of virtual ports or a greater virtual port size may be allocated for cell edge users.

Since the scenario of the serving cell is constantly changing, the mapping device may determine a plurality of virtual port modes for use. The first means 601, based on the virtual port modes, at least one transceiver unit in the massive MIMO is mapped to a virtual port corresponding to the transceiver unit in the virtual port modes through hybrid beamforming.

Figure 7:
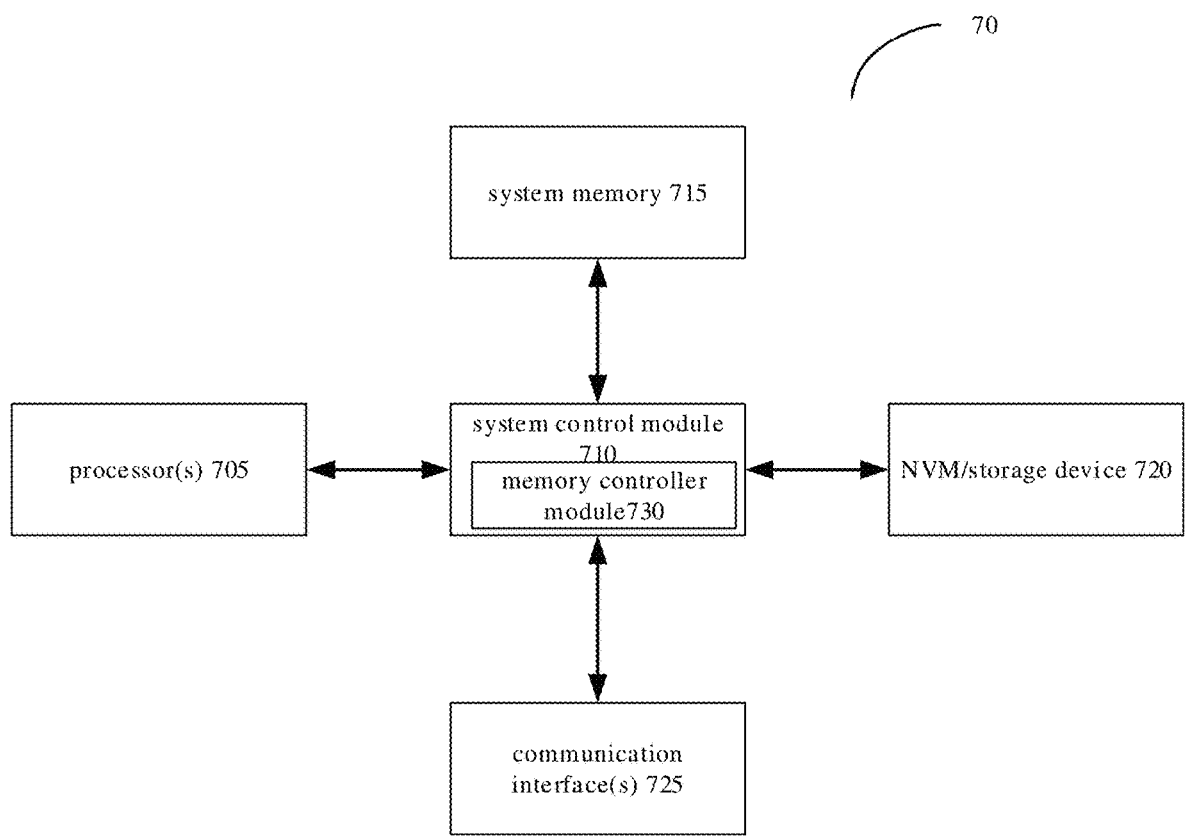
FIG. 7 shows an exemplary system that can be used to implement the various embodiments described in the present disclosure.

FIG. 7 shows an exemplary system that can be used to implement the various embodiments described in the present disclosure.

In some embodiments, the system 70 can be implemented as any device in the embodiments shown in FIG. 1, FIG. 2, FIG. 3, FIG. 4, FIG. 5, FIG. 6, or other described embodiments. In some embodiments, system 70 may include one or more computer readable media (e.g., system memory or NVM/storage device 720) having instructions and one or more processors (e.g., processor(s) 705) coupled with the one or more computer readable media and configured to execute the instructions to implement modules to perform the actions described in the present disclosure.

For one embodiment, system control module 710 may include any suitable interface controller to provide any suitable interface to at least one of processor(s) 705 and/or to any suitable device or component in communication with system control module 710.

The system control module 710 may include a memory controller module 730 to provide an interface to the system memory 715. Memory controller module 730 may be a hardware module, a software module, and/or a firmware module.

System memory 715 may be used to load and store data and/or instructions, for example, for system 70. For one embodiment, system memory 715 may include any suitable volatile memory, such as suitable DRAM. In some embodiments, system memory 715 may include a Double Data Rate type Fourth Synchronous Dynamic Random Access Memory (DDR4 SDRAM).

For one embodiment, system control module 710 may include one or more input/output (I/O) controllers to provide an interface to NVM/storage device 720 and communication interface(s) 725.

For example, NVM/storage device 720 may be used to store data and/or instructions. NVM/storage device 720 may include any suitable non-volatile memory (e.g., flash memory) and/or may include any suitable non-volatile storage device(s) (e.g., one or more hard disk drives (HDD), one or more Compact Disc (CD) drives, and/or one or more Digital Versatile Disc (DVD) drives).

NVM/storage device 720 may include storage resources that are physically part of the device on which system 70 is installed, or it may be accessible by the device and not necessarily to be part of the device. For example, NVM/storage device 720 may be accessed via the communication interface(s) 725 through the network.

Communication interface(s) 725 may provide an interface for system 70 to communicate via one or more networks and/or with any other suitable devices. System 70 may wirelessly communicate with one or more components of a wireless network according to any of one or more wireless network standards and/or protocols.

For one embodiment, at least one of the processor(s) 705 may be packaged together with logic for one or more controller(s) (e.g., memory controller module 730) of the system control module 710. For one embodiment, at least one of the processor(s) 705 may be packaged together with logic for one or more controller(s) of the system control module 710 to form a System in Package (SiP). For one embodiment, at least one of the processor(s) 705 may be integrated with logic for one or more controller(s) of the system control module 710 on the same mold. For one embodiment, at least one of the processor(s) 705 may be integrated with logic for one or more controller(s) of system control module 710 on the same mold to form a system on chip (SoC).

In various embodiments, the system 70 may be, but is not limited to being: a server, a workstation, a desktop computing device, or a mobile computing device (for example, a laptop computing device, a handheld computing device, a tablet, a netbook, etc.). In various embodiments, the system 70 may have more or fewer components and/or different architectures. For example, in some embodiments, the system 70 includes one or more cameras, a keyboard, a Liquid Crystal Display (LCD) screen (including a touch screen display), a non-volatile memory port, multiple antennas, a graphics chip, an Application Specific Integrated Circuit (ASIC), and speakers.

Obviously, those skilled in the art can make various changes and modifications to the application without departing from the spirit and scope of the application. In this way, if such modifications and variations of the present application fall within the scope of the claims of the present application and their equivalents, the present application is intended to include such modifications and variations as well.

It should be noted that the present application may be implemented in software and/or a combination of software and hardware, for example, it can be implemented using an Application Specific Integrated Circuit (ASIC), a general purpose computer or any other similar hardware device. In one embodiment, the software programs of the present application may be executed by a processor to implement the steps or functions described above. Similarly, the software programs (including associated data structures) of the present application can be stored in a computer readable recording medium, such as RAM memory, magnetic or optical drive or diskette and the like. Further, some steps or functions of the present application may be implemented by hardware, for example, as a circuit that cooperates with the processor to perform each step or function.

In addition, a part of the present application may be applied as a computer program product, such as computer program instructions, which, when executed by a computer, may invoke or provide the method and/or solution according to the present application through the operation of the computer. Those skilled in the art should understand that the forms of computer program instructions that reside on a computer readable medium include, but are not limited to, source files, executable files, installation package files, and the like, and that the manner in which the computer program instructions are executed by a computer includes, but is not limited to: the computer directly executes the instruction, or the computer compiles the instruction and then executes the corresponding compiled program, or the computer reads and executes the instruction, or the computer reads and installs the instruction and then executes the corresponding installed program. In this regard, computer readable media can be any available computer readable storage media or communication media that can be accessed by a computer.

Communication media includes media whereby communication signals, including, for example, computer readable instructions, data structures, program modules, or other data, are transmitted from one system to another. Communication media may include conductive transmission media (such as cables and wires (e.g., fiber optics, coaxial, etc.)) and wireless (non-conductive transmission) media capable of propagating energy waves, such as sound, electromagnetic, RF, microwave, and infrared. Computer readable instructions, data structures, program modules or other data may be embodied as, for example, a modulated data signal in a wireless medium (such as a carrier wave or such as a similar mechanism embodied as part of spread spectrum technology). The term "modulated data signal" means a signal that has one or more of its characteristics set or changed in such a manner as to encode information in the signal. The modulation may be analog, digital, or hybrid modulation techniques.

By way of example, and not limitation, computer-readable storage media may include volatile and nonvolatile, removable and non-removable media implemented in any method or technology for storage of information such as computer-readable instructions, data structures, program modules or other data. For example, computer-readable storage media include, but are not limited to, volatile memory such as random access memory (RAM, DRAM, SRAM); and non-volatile memory such as flash memory, various read-only memories (ROM, PROM, EPROM, EEPROM), magnetic and ferromagnetic/ferroelectric memories (MRAM, FeRAM); and magnetic and optical storage devices (hard disk, magnetic tape, CD, DVD); or other now known media or later developed that are capable of storing computer-readable information/data for use by a computer system.

An embodiment according to the present application herein comprises an apparatus comprising a memory for storing computer program instructions and a processor for executing the program instructions, wherein the computer program instructions, when executed by the processor, trigger the apparatus to perform a method and/or solution according to embodiments of the present application as described above.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction, thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

The various aspects of the various embodiments are specified in the claims. These and other aspects of the various embodiments are specified in the following numbered items:

1. A method for virtual port mapping of massive MIMO, wherein the method comprises:
   mapping at least one transceiver unit in massive MIMO to a virtual port through hybrid beamforming;
   performing digital precoding based on the virtual port.

2. The method according to item 1, wherein the step of hybrid beamforming comprises:
   performing analog beamforming in at least one transceiver unit in massive MIMO;
   performing digital precoding between the transceiver units after the analog beamforming.

3. The method according to item 1 or 2, wherein the method further comprises:
   determining hybrid beamforming weight corresponding to at least one transceiver unit in massive MIMO;
   wherein the step of mapping to a virtual port comprises:
   mapping the at least one transceiver unit to a virtual port through hybrid beamforming according to the hybrid beamforming weight.

4. The method according to item 3, wherein the hybrid beamforming weight comprises analog beamforming weight in transceiver unit and/or digital precoding weight between transceiver units.

5. The method according to any of items 1 to 4, wherein the method further comprises:
   determining one or more virtual port modes for the massive MIMO according to user distribution of the cell served by the massive MIMO, wherein the virtual port modes comprise the number of virtual ports corresponding to the massive MIMO, the number of transceiver units in each virtual port, and position information of the transceiver units among antenna arrays;
   Wherein the step of mapping to a virtual port comprises:
   mapping, based on the virtual port mode, at least one transceiver unit in the massive MIMO to a virtual port corresponding to the transceiver unit in the virtual port mode through hybrid beamforming.

6. The method according to item 5, wherein the step of determining one or more virtual port modes for the massive MIMO comprises:
   determining one or more candidate virtual port modes for the massive MIMO according to the potential user distribution of the cell served by the massive MIMO, wherein the candidate virtual port modes comprise the number of virtual ports corresponding to the massive MIMO, the number of transceiver units in each virtual port and position information of the transceiver units among antenna arrays;
   determining at least one candidate virtual port mode as the virtual port modes corresponding to the massive MIMO according to the current time domain and/or frequency domain demand information of the cell served by the massive MIMO.

7. A mapping device for virtual port mapping of massive MIMO, wherein the mapping device comprises:
   means for mapping at least one transceiver unit in massive MIMO to a virtual port through hybrid beamforming;
   means for performing digital precoding based on the virtual port.

8. The mapping device according to item 7, wherein the means for mapping at least one transceiver unit in massive MIMO to a virtual port through hybrid beamforming is configured for:
   performing analog beamforming in at least one transceiver unit in massive MIMO;
   performing digital precoding between the transceiver units after the analog beamforming.

9. The mapping device according to item 7 or 8, wherein the mapping device further comprises:
   means for determining hybrid beamforming weight corresponding to at least one transceiver unit in massive MIMO;
   wherein the means for mapping at least one transceiver unit in massive MIMO to a virtual port through hybrid beamforming is configured for:
   mapping the at least one transceiver unit to a virtual port through hybrid beamforming according to the hybrid beamforming weight.

10. The mapping device according to item 9, wherein the hybrid beamforming weight comprises analog beamforming weight in transceiver unit and/or digital precoding weight between transceiver units.

11. The mapping device according to any of items 7 to 10, wherein the mapping device further comprises:

means for determining one or more virtual port modes for the massive MIMO according to user distribution of the cell served by the massive MIMO, wherein the virtual port modes comprise the number of virtual ports corresponding to the massive MIMO, the number of transceiver units in each virtual port, and position information of the transceiver units among antenna arrays;

Wherein the means for mapping at least one transceiver unit in massive MIMO to a virtual port through hybrid beamforming is configured for:

mapping, based on the virtual port mode, at least one transceiver unit in the massive MIMO to a virtual port corresponding to the transceiver unit in the virtual port mode through hybrid beamforming.

12. The mapping device according to item 11, wherein the means for determining one or more virtual port modes for the massive MIMO is configured for:

determining one or more candidate virtual port modes for the massive MIMO according to the potential user distribution of the cell served by the massive MIMO, wherein the candidate virtual port modes comprise the number of virtual ports corresponding to the massive MIMO, the number of transceiver units in each virtual port and position information of the transceiver units among antenna arrays;

determining at least one candidate virtual port mode as the virtual port modes corresponding to the massive MIMO according to the current time domain and/or frequency domain demand information of the cell served by the massive MIMO.

13. A base station for virtual port mapping of massive MIMO, wherein the base station comprises the mapping device according to any of items 7 to 12.

14. A computer readable storage medium having computer readable instructions stored therein which, when executed by one or more devices, cause the devices to perform the method according to any of items 1 to 6.

15. A computer program product, when the computer program product is executed by a computer device, the method according to any one of items 1 to 6 is performed.

16. A computer device, the computer device comprising:
one or more processors;
a memory for storing one or more computer programs;
the one or more computer programs, when executed by the one or more processors, cause the one or more processors to implement the method according to any of items 1 to 6.

The invention claimed is:

1. A method for virtual port mapping of a massive multiple-input multiple-output (MIMO), the massive MIMO including a plurality of transceiver units, wherein the method comprises:

mapping at least one transceiver unit of the plurality of transceiver units in the massive MIMO to a virtual port through hybrid beamforming, the hybrid beamforming including performing analog beamforming on the at least one transceiver unit; and performing digital precoding based on the virtual port on the at least one transceiver unit after the analog beamforming; and determining one or more virtual port modes for the massive MIMO according to user distribution of user equipment devices of at least one cell served by the massive MIMO, wherein the one or more virtual port modes comprising a total number of virtual ports corresponding to the massive MIMO, a total number of transceiver units included in each virtual port, and position information of the plurality of transceiver units among antenna arrays included in the massive MIMO, and the mapping the at least one transceiver unit to the virtual port further comprises, mapping, based on the virtual port mode, the at least one transceiver unit in the massive MIMO to the virtual port corresponding to the at least one transceiver unit in the virtual port mode through the hybrid beamforming.

2. The method according to claim 1, wherein the method further comprises:

determining hybrid beamforming weight corresponding to the at least one transceiver unit in the massive MIMO; and the mapping the at least one transceiver unit to the virtual port further comprises, mapping the at least one transceiver unit to the virtual port through the hybrid beamforming according to the hybrid beamforming weight.

3. The method according to claim 2, wherein the hybrid beamforming weight comprises at least one analog beamforming weight corresponding to the at least one transceiver unit and/or at least one digital precoding weight corresponding to the at least one transceiver unit.

4. The method according to claim 1, wherein the determining one or more virtual port modes for the massive MIMO comprises:

determining one or more candidate virtual port modes for the massive MIMO according to a potential user distribution of the user equipment devices of the cell served by the massive MIMO, wherein the one or more candidate virtual port modes comprise the total number of virtual ports corresponding to the massive MIMO, the total number of transceiver units included in each virtual port, and the position information of the plurality of transceiver units among the antenna arrays; and determining the one or more candidate virtual port modes as the virtual port mode corresponding to the massive MIMO according to a current time domain and/or frequency domain demand information of the cell served by the massive MIMO.

5. A non-transitory computer readable storage medium having computer readable instructions stored therein which, when executed by one or more devices, causes the one or more devices to perform the method according to claim 1.

6. A computer device, the computer device comprising:
one or more processors;
a memory configured to store one or more computer programs; and
the one or more computer programs, when executed by the one or more processors, cause the one or more processors to implement the method according to claim 1.

7. A mapping device for virtual port mapping of a massive multiple-input multiple-output (MIMO), the massive MIMO including a plurality of transceiver units, wherein the mapping device comprises:

memory having computer readable instructions stored thereon; and at least one processor configured to execute the computer readable instructions to cause the mapping device to, map at least one transceiver unit of the plurality of transceiver units in the massive MIMO to a virtual port through hybrid beamforming, the hybrid beamforming including performing analog beamforming on the at least one transceiver unit;

perform digital precoding based on the virtual port on the at least one transceiver unit after the analog beamforming; and determine one or more virtual port modes for the massive MIMO according to user distribution of user equipment devices of at least one cell served by the massive MIMO, wherein the one or more virtual port modes are determined based on a total number of virtual ports corresponding to the massive MIMO, a total number of transceiver units in each virtual port, and position information of the plurality of transceiver units among antenna arrays included in the massive MIMO, and the mapping the at least one transceiver unit to the virtual port further comprises, mapping, based on the virtual port mode, the at least one transceiver unit in the massive MIMO to the virtual port corresponding to the at least one transceiver unit in the virtual port mode through the hybrid beamforming.

8. The mapping device according to claim 7, wherein the mapping device is further caused to:

determine hybrid beamforming weight corresponding to the at least one transceiver unit in the massive MIMO; and perform the mapping the at least one transceiver unit to the virtual port by, mapping the at least one transceiver unit to the virtual port through hybrid beamforming according to the hybrid beamforming weight.

9. The mapping device according to claim 8, wherein the hybrid beamforming weight comprises at least one analog beamforming weight corresponding to the at least one transceiver unit and/or at least one digital precoding weight corresponding to the at least one transceiver unit.

10. The mapping device according to claim 7, wherein the mapping device is further caused to perform the determining the one or more virtual port modes for the massive MIMO by:

determining one or more candidate virtual port modes for the massive MIMO according to a potential user distribution of the user equipment devices of the cell served by the massive MIMO, wherein the one or more candidate virtual port modes are determined based on the total number of virtual ports corresponding to the massive MIMO, the total number of transceiver units included in each virtual port, and the position information of the plurality of transceiver units among the antenna arrays; and determining the one or more candidate virtual port modes as the virtual port mode corresponding to the massive MIMO according to a current time domain and/or frequency domain demand information of the cell served by the massive MIMO.

11. A base station for virtual port mapping of massive MIMO, wherein the base station comprises the mapping device according to claim 7.

* * * * *